United States Patent Office 3,397,728
Patented Aug. 20, 1968

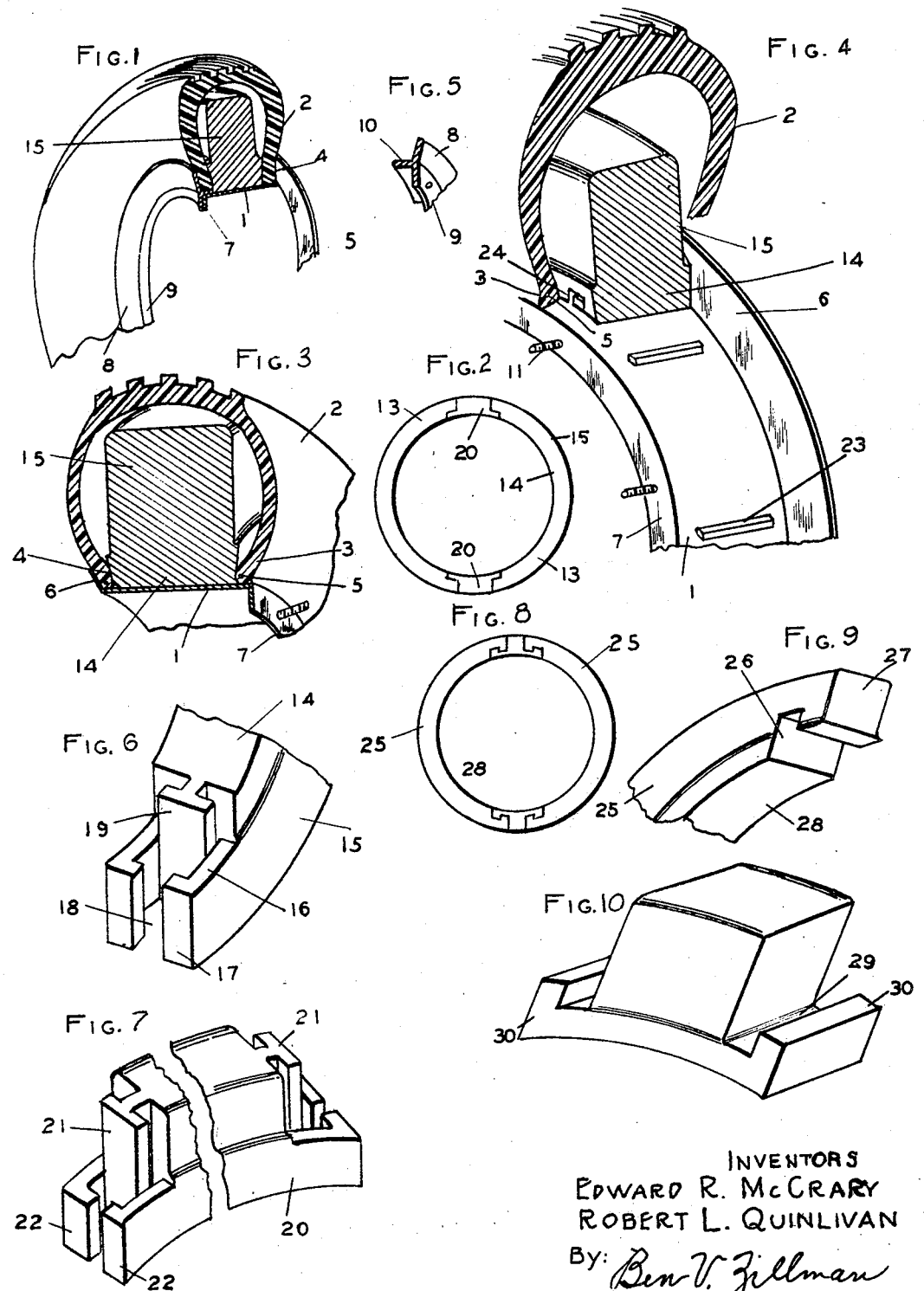

3,397,728
SAFETY TRUCK-WHEEL ASSEMBLY
Edward R. McCrary, 341 Jefferson, Valley Park, Mo. 63088, and Robert L. Quinlivan, Maplewood, Mo. (245 Elm, Glendale, Mo. 63122)
Filed Aug. 19, 1966, Ser. No. 573,539
2 Claims. (Cl. 152—158)

ABSTRACT OF THE DISCLOSURE

A pneumatic tire having a solid safety tire of slightly smaller cross section mounted on the rim between the tire beads. The safety tire comprises a plurality of arcuate segments held together by key structures therebetween.

---

The present invention relates generally to a wheel assembly for pneumatically-tired vehicles, especially trucks, and wherein we provide a reliable and efficient means for preventing total collapse of the tire in the event of a blowout or puncture of the latter.

It is well-recognized that truck tires are relatively heavier and less elastic than the usual passenger-car tires, as they must withstand very heavy loading, so that when there is a blow-out, the tire is relatively difficult to repair or replace until a properly-equipped service station is reached.

One of the important objects of our invention is to so construct such a tire assembly that, in the event of partial or complete leakage of air from the tire, especially from one of the front ones, the load will be substantially fully supported by the safety member of the tire assembly, thus permitting the vehicle to proceed to the desired service center. Such a safety device prevents loss of steering control and avoids possible damage to the vehicle and contents, or injury to the driver or to pedestrians in the path of the vehicle.

Another object of the invention is to so construct such a safety member that it is comprised of a plurality of arcuate segments easily inserted within the truck tire, and is strong enough to properly and fully support the load, even when the tire is partially or fully deflated.

An added object of our invention is to so construct said safety device that it fills the major portion of the tire interior, allowing sufficient clearance from the opposed inside wall of the latter to permit of continuing the advancement of the vehicle to the desired replacement point.

A still further object of the invention is to so construct such a safety member that it is made of a plurality of arcuate inflexible solid segments whose adjacent ends are spaced apart for being detachably interlocked by similarly inflexible keys, said keys and segments having their radially innermost or base portions whose width is substantially equal to the distance between the opposed tire beads at the open side or end of the tire, the major portion of the keys and segments being reduced in lateral width and height so as to be spaced from the opposed inner wall surface of the tire.

Referring to the drawings, wherein like reference characters represent like or corresponding parts throughout the views, FIGURE 1 is a fragmentary perspective view, partially in section, showing the assembly construction;

FIGURE 2 is a plan view of the safety member in interlocked form;

FIGURE 3 is a fragmentary perspective view, partially in section, showing the assembly prior to receiving the locking rim element;

FIGURE 4 is another fragmentary perspective view, partially in section, as seen from the opposite side;

FIGURE 5 is a fragmentary perspective view of the locking rim;

FIGURE 6 is a fragmentary perspective view of an end of one of the segments;

FIGURE 7 is a fragmentary perspective view of one of the locking keys;

FIGURE 8 is a plan view similar to that shown in FIG. 2, but of a modified form of safety tire;

FIGURE 9 is a fragmentary view, of an end of one of the segments shown in FIG. 8; and FIGURE 10 is a perspective view of the key that cooperates with the segments shown in FIG. 9.

Again referring to the drawings, wherein we have illustrated preferred embodiments of the invention, there is shown a fragment of a truck front tire, having a tire carrying main portion 1 whose width is substantially equal to the full width of the tire 2 between the bottom of the beads 3 and 4 of the latter at the open side or end of the same. These beads are generally reinforced by steel wires or the like 5. This rim has one radially-outwardly extending flange 6 fixed annularly thereto to engage one of the tire beads, and there is a radially-inwardly directed flange 7 extending annularly at the other edge of the portion 1.

A detachably mountable annular rim member is arranged for placement on said flange 7 and is in the form of a "T-ring" having oppositely directed arms 8 and 9, respectively, one of which is superimposed on the flange 7, while the other is pressed against the second one of the tire beads 4, there being an annular leg or tongue 10 extending substantially at right angles from intermediate the ends of said legs or arms 8 and 9 so that it may fit between the tire bead 4 and the rim portion 1. Studs 11 may be provided on the flange 7 to detachably clamp said rim member to said flange to thereby hold the tire in place between said flanges, the cooperating tightening nuts not being shown, for the sake of clarity.

Inside of this pneumatic tire there is adapted to be mounted a safety tire as seen in FIGS. 2, 6 and 7, comprising a plurality of like arcuate segments 13—13 to form an annular member, said segments being of suitably strong and inflexible material, such as steel, able to withstand the full vehicle load in the event of tire collapse.

Said segments are of such cross-sectional shape that the base or lowermost, or radially innermost portion 14 is of substantially the full width of the tire between its beads, so as to fit on the rim 1 between said beads. The remaining or upper portion of each segment is reduced in transverse cross-section radially outwardly from said base portion, as at 15, to normally provide a clearance between its exterior and the opposed inner wall surface of the tire, to thereby permit partial collapse of the latter.

It is to be particularly noted that the arcuate length of each segment is sufficiently short as compared with the innermost tire diameter, to permit of ready insertion of such segments into the tire by simply lifting the side edges of the latter at the bead, even though said tire is relatively stiff and flexes with difficulty. If these segments were longer, such insertion would be well-nigh impossible without using special tools.

In order to interlock adjacent segments, the ends of the latter are provided with key-ways and mortises, the radially innermost portion of each segment being cut back, as at 16 to thereby reduce the overall height thereat, and is provided with a pair of side arms 17—17 that are spaced apart to provide an opening 18 therebetween. A T-shaped mortise 19 extends radially of the segment and is rearwardly of the arms 17—17 as shown.

A key or block 20 has each end provided with a radially-extending T-shaped tenon 21 of a size equal to the tenon 19 and adapted to be superimposed on the latter, and spaced-apart side arms 22—22, all to cooperatingly engage the corresponding mortises and tenons of the segment ends. The exterior of the keys are of substantially the same contour as that of the segments, so as to be substantially flush with the latter.

The opposite ends of said key are alike to interlock the segments when the key is slidably radially inserted between the adjacent spaced-apart segment ends.

To assemble the device, these keys are pressed radially outwardly between each pair of arcuate segments that have been placed within the tire, and when the key is locked in position it locks said segments, its exterior surface will be substantially flush with that of the adjacent ends of the segments. If desired, and in order to prevent accidental peripheral rotation of the safety tire on the rim, there may be a spline and groove interfit therebetween, as for instance the spaced-apart splines 23—23 formed on the rim portion to engage with the grooves 24 formed in the radially innermost rim-engaging portion of the segments.

In the modification shown in FIGS. 8, 9 and 10, each end of the safety tire segments 25—25 is provided with a radial mortise 26 extending from the base portion 28, and thence with a projecting tenon 27 at the terminal end of the segment from the outer peripheral surface to slightly past the bottom of the mortise 26.

The key 29 that cooperates with the opposed ends of the adjacent segments 25—25 is provided with end tenons 30—30 to fit into the mortises 26—26, and with mortises 29—29 to receive the correspondingly shaped tenons 27—27, so that when the adjacent segments and keys are interlocked, their external surfaces will be flush with one another.

It is to be stressed that in the foregoing assemblies, the device is especially adapted for use in the usual and relatively heavy tubeless front truck tire having metal wires in its beads, and in which the safety tire is made of a substantially inflexible solid material that fills the major portion of the tire interior and has a radially innermost base portion that extends across substantially the full width of the wheel rim, while its portion that is radially outwardly therefrom is of such contour that it is normally spaced from the opposed interior wall surface of the tire, with predetermined clearance therebetween to permit usual operation of the tire and yet be ready to substantially support the load in the event of an accidental loss of air from the tire.

We claim:

1. For use with a pneumatic tubeless truck tire assembly in which there is an endless first annular rim member extending across substantially the full width of the tire at its beads and engaging one of said beads, and a detachably mountable second annular rim for placement on said first rim member to engage the other bead of said tire; of a substantially inflexible safety annular tire mountable within said pneumatic tire and remaining therein during normal service of the latter, with a base portion to engage substantially across the full width of said first rim member between the opposed beads and with its remaining portion reduced in cross-section to provide a constant predetermined clearance from the inside wall surface of the pneumatic tire, said safety tire comprising a plurality of arcuate segments each of a length less than the internal diameter of said pneumatic tire, and keys of substantially the same external shape as the safety tire segments to interlockingly fit between a pair of adjacent ends of the latter and be substantially flush with said segments, said segments and keys provided with cooperating mortises and tenons at their opposed ends to detachably interlock and maintain the safety tire in substantially endless tubular form, the safety tire remaining within said pneumatic tire and supporting the entire load in the event of collapse of said pneumatic tire.

2. A device as set forth in claim 1, further characterized in that the ends of said keys are exactly alike, with each key end having a tenon extending radially from the key base, and a radially extending mortise next adjacent said tenon and arranged between said tenon and the next adjacent opposed wall of the key.

References Cited

UNITED STATES PATENTS

| | | | |
|---|---|---|---|
| 1,367,856 | 2/1921 | Bostwick | 152—312 |
| 1,389,806 | 9/1921 | Ambohl et al. | 152—308 XR |
| 2,224,066 | 3/1940 | Shore | 152—158 |
| 3,049,162 | 8/1962 | Rosenbaum et al. | 152—158 |
| 1,494,797 | 5/1924 | Nimschke. | |

ARTHUR L. LA POINT, *Primary Examiner.*